(12) United States Patent
Zhou et al.

(10) Patent No.: US 11,178,993 B2
(45) Date of Patent: Nov. 23, 2021

(54) RICE COOKER WITH LID AND BODY CONTROL PANELS

(71) Applicant: FOSHAN SHUNDE MIDEA ELECTRICAL HEATING APPLIANCES MANUFACTURING CO., LTD., Foshan (CN)

(72) Inventors: Yi Zhou, Foshan (CN); Junfeng Du, Foshan (CN); Guozhu Li, Foshan (CN); Jingwen Li, Foshan (CN); Fuyou Li, Foshan (CN); Peng Chen, Foshan (CN); Xiong Liao, Foshan (CN); Jiaying Zhang, Foshan (CN); Hao Zheng, Foshan (CN)

(73) Assignee: Foshan Shunde Midea Electrical Heating Appliances Manufacturing Co., Ltd., Foshan (CN)

( * ) Notice: Subject to any disclaimer, the term of this patent is extended or adjusted under 35 U.S.C. 154(b) by 263 days.

(21) Appl. No.: 16/110,866

(22) Filed: Aug. 23, 2018

(65) Prior Publication Data
US 2019/0246829 A1    Aug. 15, 2019

Related U.S. Application Data

(63) Continuation of application No. PCT/CN2018/079870, filed on Mar. 21, 2018.

(30) Foreign Application Priority Data

Feb. 9, 2018   (CN) .......................... 201810140256.0

(51) Int. Cl.
*A47J 27/00* (2006.01)
*A47J 27/08* (2006.01)
(Continued)

(52) U.S. Cl.
CPC ............. *A47J 27/004* (2013.01); *A47J 27/04* (2013.01); *A47J 27/0802* (2013.01); *G01G 19/414* (2013.01); *G01G 19/52* (2013.01)

(58) Field of Classification Search
CPC .................................................. A47J 27/0802
See application file for complete search history.

(56) References Cited

U.S. PATENT DOCUMENTS

2014/0007779 A1* 1/2014 Hoare ...................... A23G 9/12
99/342
2014/0377417 A1* 12/2014 Martinez ............... A47J 36/321
426/231

FOREIGN PATENT DOCUMENTS

CN    103245406 A       8/2013
CN    105747829 A   *   7/2016
(Continued)

OTHER PUBLICATIONS

Notice of Reasons for Refusal, JP2018-537755, dated Feb. 25, 2020, 8 pgs.
(Continued)

*Primary Examiner* — John J Norton
(74) *Attorney, Agent, or Firm* — Morgan, Lewis & Bockius LLP

(57) ABSTRACT

Disclosed is a cooking appliance that includes a cooker body assembly, a lid assembly, a weighing sensor, a first control panel, and a second control panel. The cooker body assembly includes a housing and an inner pot disposed inside the housing. The lid assembly can be opened and closed to cover the inner pot. The first control panel is disposed on the lid assembly, and the second control panel is disposed on the housing. The weighing sensor is electrically connected to the second control panel. According to this disclosure, the second control panel is disposed on the housing, so that the
(Continued)

second control panel does not flip to the rear side together with the lid assembly when the lid assembly is opened to add food or water.

7 Claims, 3 Drawing Sheets

(51) Int. Cl.
  *G01G 19/414* (2006.01)
  *G01G 19/52* (2006.01)
  *A47J 27/04* (2006.01)

(56) References Cited

FOREIGN PATENT DOCUMENTS

| | | | | |
|---|---|---|---|---|
| CN | 105747829 | A | | 7/2016 |
| CN | 105982509 | A | | 10/2016 |
| CN | 206239117 | U | | 6/2017 |
| CN | 206239117 | U | * | 6/2017 |
| JP | 07100059 | A | * | 4/1995 |
| JP | H07100059 | A | | 4/1995 |
| JP | 07177962 | A | * | 7/1995 |
| JP | H 9-108098 | A | | 4/1997 |
| JP | H10117926 | A | | 5/1998 |
| JP | 2000093291 | A | * | 4/2000 |
| JP | 2005000486 | A | | 1/2005 |
| JP | 20050118318 | A | | 5/2005 |
| JP | 2006081641 | | | 3/2006 |
| JP | 2006081641 | A | * | 3/2006 |
| JP | 2006136373 | | | 6/2006 |
| JP | 2013236807 | | | 11/2013 |
| JP | 2013236807 | A | * | 11/2013 |
| JP | 2017079207 | | | 4/2017 |
| JP | 2017079207 | A | * | 4/2017 |

OTHER PUBLICATIONS

International Search Report, PCT/CN2018/079870, dated Oct. 22, 2018, 10 pgs. (No English Translation Available).

Office Action, KR2019051447535, dated Jul. 17, 2019, 4 pgs. (No English Translation Available).

* cited by examiner

RICE COOKER WITH LID AND BODY CONTROL PANELS

PRIORITY CLAIM AND RELATED APPLICATION

This application is a continuation of PCT Patent Application No. PCT/CN2018/079870, entitled "COOKING APPLIANCE" filed on Mar. 21, 2018, which claims priority to Chinese Patent Application No. 201810140256.0, entitled "COOKING APPLIANCE" filed on Feb. 9, 2018, both of which are hereby incorporated by reference in their entirety.

FIELD OF THE DISCLOSURE

This disclosure generally relates to the technical field of cooking utensils, and more particularly relates to a cooking appliance.

BACKGROUND OF THE DISCLOSURE

Most existing rice cookers 10' having weighing functionality are as the rice cooker illustrated in FIG. 1. Such a rice cooker only has a control panel on the top surface of the lid. As such, the user needs to open the lid when adding food materials or water, and needs to close the lid when performing the weighing function so as to view the food weight and the amount of added water that are displayed on the display interface under the closed-lid condition. This causes the user to frequently open and close the lid during the use of the rice cooker, causing great inconvenience to the user. Another solution for the existing rice cookers with weighing functionality is to set a control panel on the cooker body. However, the installation space reserved by the cooker body for the control panel is generally small, thus resulting in a small size of the control panel. This makes it not easy for the user to observe, thereby easily causing the misoperation by users.

SUMMARY OF THE DISCLOSURE

It is therefore one main object of this disclosure to provide a cooking appliance, aiming to facilitate the user's use and reduce the user's misoperation.

In order to achieve the above object, the cooking appliance proposed by this disclosure includes: a cooker body assembly including a housing and an inner pot disposed inside the housing; a lid assembly that can be opened and closed to cover the inner pot; a first control panel disposed on the lid assembly; a second control panel disposed on the housing; and a weighing sensor electrically connected to the second control panel. The second control panel is configured to control the weighing sensor to measure the weight of a food material in the inner pot and display the weight of the food material.

In some embodiments, a protruding block is provided on the top of the housing, and the second control panel is fixedly disposed on a top surface of the protruding block.

In some embodiments, the first control panel is disposed on a top surface of the lid assembly, and the first control panel is flush with the second control panel under the closed-lid state.

In some embodiments, the second control panel is provided with a metering button and a display area. The cooking appliance further includes a first signal processor, which is electrically connected to the second control panel and which is configured to calculate a target amount of water added to the food material and display the target amount of water through the display area material.

In some embodiments, the cooking appliance further includes a first indicator electrically connected to the first signal processor. The first signal processor is configured to activate the first indicator based on the actual amount of water added and the target amount of water added.

In some embodiments, the second control panel is further provided with a thermal calculation button. The cooking appliance further includes a second signal processor, which is electrically connected to the second control panel and which is configured to calculate the calories of the food material and display the calories of the food material through the display area.

In some embodiments, the cooking appliance further includes a second indicator electrically connected to the second signal processor. The second signal processor is configured to activate the second indicator based on the calories of the food material and a preset threshold calorific value.

In some embodiments, the first control panel is provided with one or more cooking function buttons and a function display area.

In some embodiments, the cooking appliance further includes a controller, a first control circuit, and a second control circuit. The first control panel is electrically connected to the controller through the first control circuit, and the second control panel is electrically connected to the controller through the second control circuit. The controller is configured to turn on the first control circuit and disconnect the second control circuit when the cooking appliance is in a closed-lid state. The controller is also configured to turn on the second control circuit and disconnect the first control circuit when the cooking appliance is in a open-lid state.

In some embodiments, the cooking appliance is a rice cooker or an electric pressure cooker.

The cooking appliance proposed by this disclosure is provided with a second control panel on housing. Thus, when the lid assembly is opened to add food materials or water, the second control panel does not flip to the rear side together with the lid assembly and so can still be used normally. As such, under the open-lid state the second control panel can be used to control the weighing sensor to detect the weight information of the food material placed within the inner pot, and further display the weight information of the food material. This facilitates the user to use the weighing function of the rice cooker. In addition, the cooking appliance proposed in this disclosure is provided with a first control panel on the lid assembly and provided with a second control panel on the housing, and the first control panel and the second control panel are further provided with respective control buttons serving different functions. Thus, the rice cooker proposed by this disclosure can make full use of the exterior space of the rice cooker and increase the area of the control interface, making the control interface easy to manipulate and recognize, thereby avoiding the user's misoperation.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art will now be briefly described. It is evident that the accompanying drawings listed in the following description show merely some embodiments according to this disclosure, and that those having ordinary skill in the art will be able to obtain other drawings based on the arrangements shown in these drawings without making inventive efforts, where in these drawings:

FIG. 4 is a schematic diagram of the electrical connections of the second control panel.

EXPLANATION OF REFERENCE SIGNS

Figure 1:
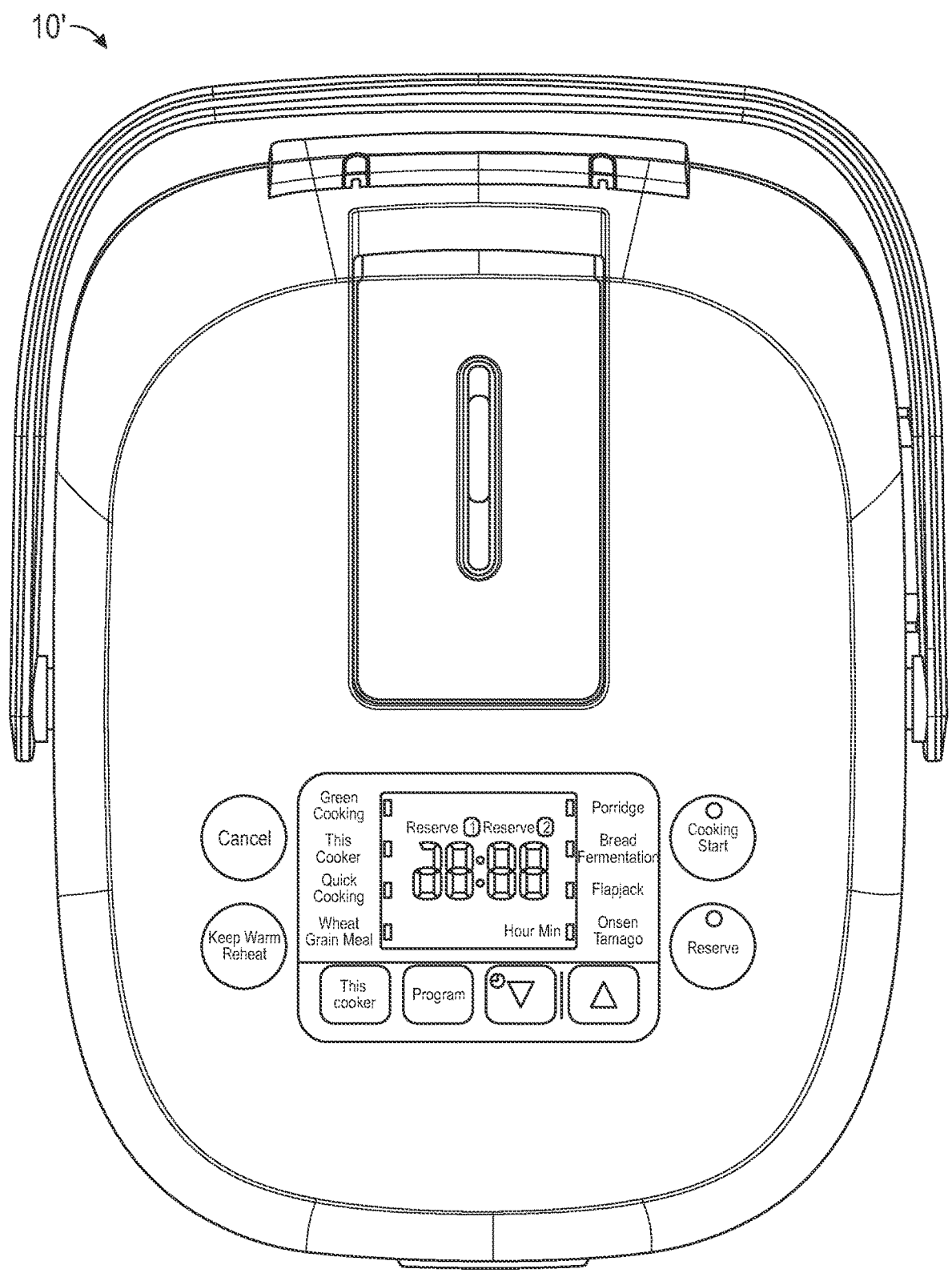
FIG. 1 is a top view of a prior art cooking appliance.

| Reference Sign | Name | Reference Sign | Name |
|---|---|---|---|
| 10 | Cooking Appliance | 410 | Cooking Function Button |
| 100 | Housing | 420 | Function Display Area |
| 200 | Inner Pot | 510 | Metering Button |
| 300 | Lid Assembly | 520 | Display Area |
| 400 | First Control Panel | 530 | Thermal calculation button |
| 500 | Second Control Panel | | |

Various implementations, functional features, and advantages of this disclosure will now be described in further detail in connection with some illustrative embodiments and the accompanying drawings.

DETAILED DESCRIPTION OF THE EMBODIMENTS

Technical solutions embodied in the embodiments of this disclosure will now be clearly and comprehensively described in connection with the accompanying drawings for these embodiments. Apparently, the described embodiments are merely some but not all embodiments of this disclosure. All other embodiments obtained by persons of ordinary skill in the art based on the embodiments of this disclosure without making creative efforts shall all fall within the protection scope of the present disclosure.

As used herein, all directional indicators (such as "upper," "lower," "left," "right," "front," "rear," . . . ) in the embodiments of this disclosure are merely used to explain the relative positions and movement or the like between various components under a specific posture (as shown in the drawings), and should the specific posture change, these directional indicators will also change accordingly.

As used herein, terms such as "first," or "second," are intended for illustrative purposes only and are not to be construed as indicating or implying their relative importance or implicitly indicating the number of the specified technical features. Thus, features defined by terms such as "first," or "second" may explicitly or implicitly include at least one of such a feature. Additionally, technical solutions of various embodiments may be combined with one another, but such combinations must be based on the achievability by those of ordinary skill in the art. Where a combination of technical solutions ends up contradictory or unachievable, such a combination shall not be regarded as existent nor would it fall within the scope of protection of this disclosure.

This disclosure provides a cooking appliance. The cooking appliance is provided with both a first control panel and a second control panel, which can facilitate convenient use of the user and avoid misoperation of the user.

Figure 2:
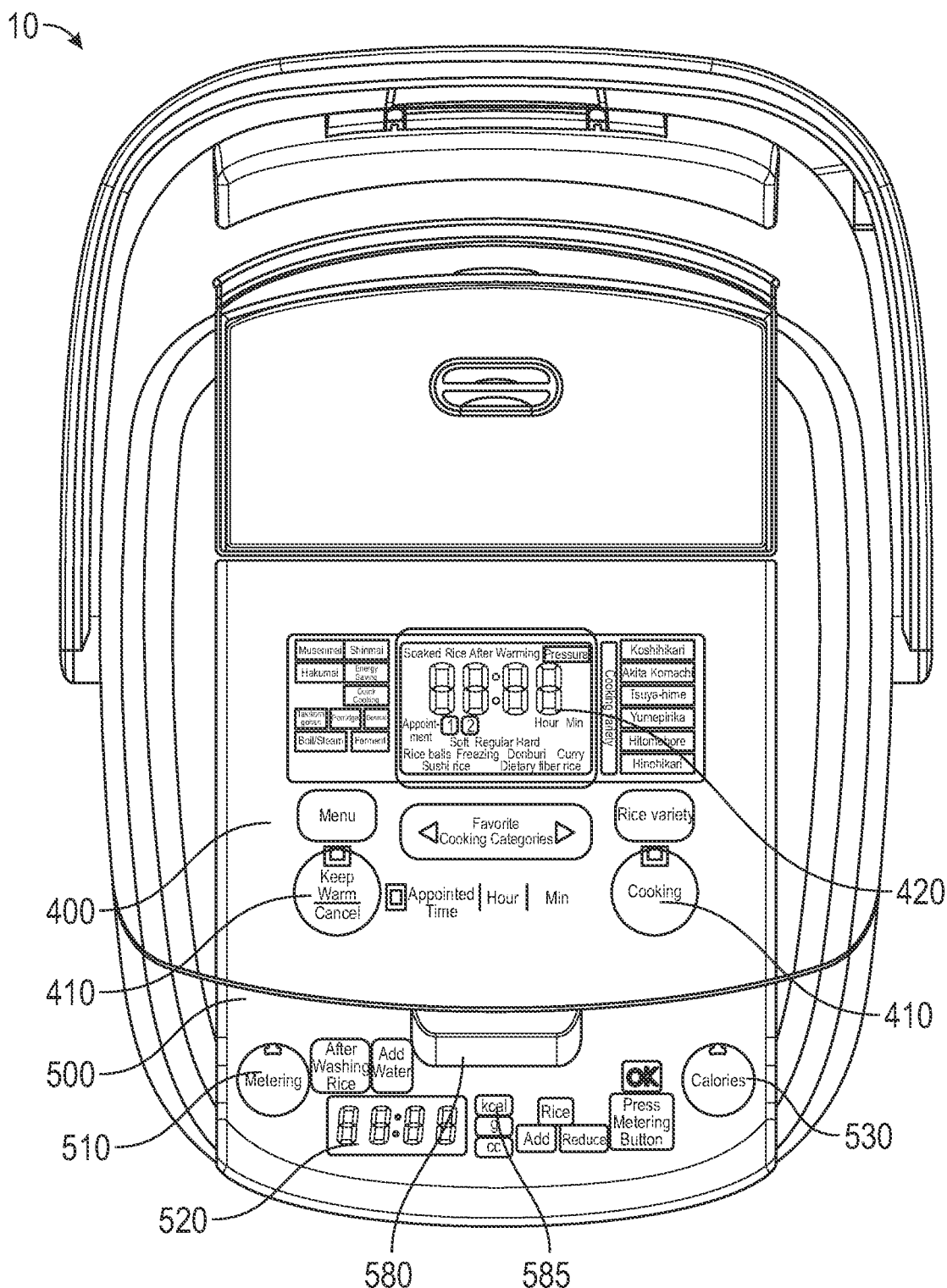
FIG. 2 is a top view of an embodiment of a cooking appliance in accordance with this disclosure.
Figure 3:
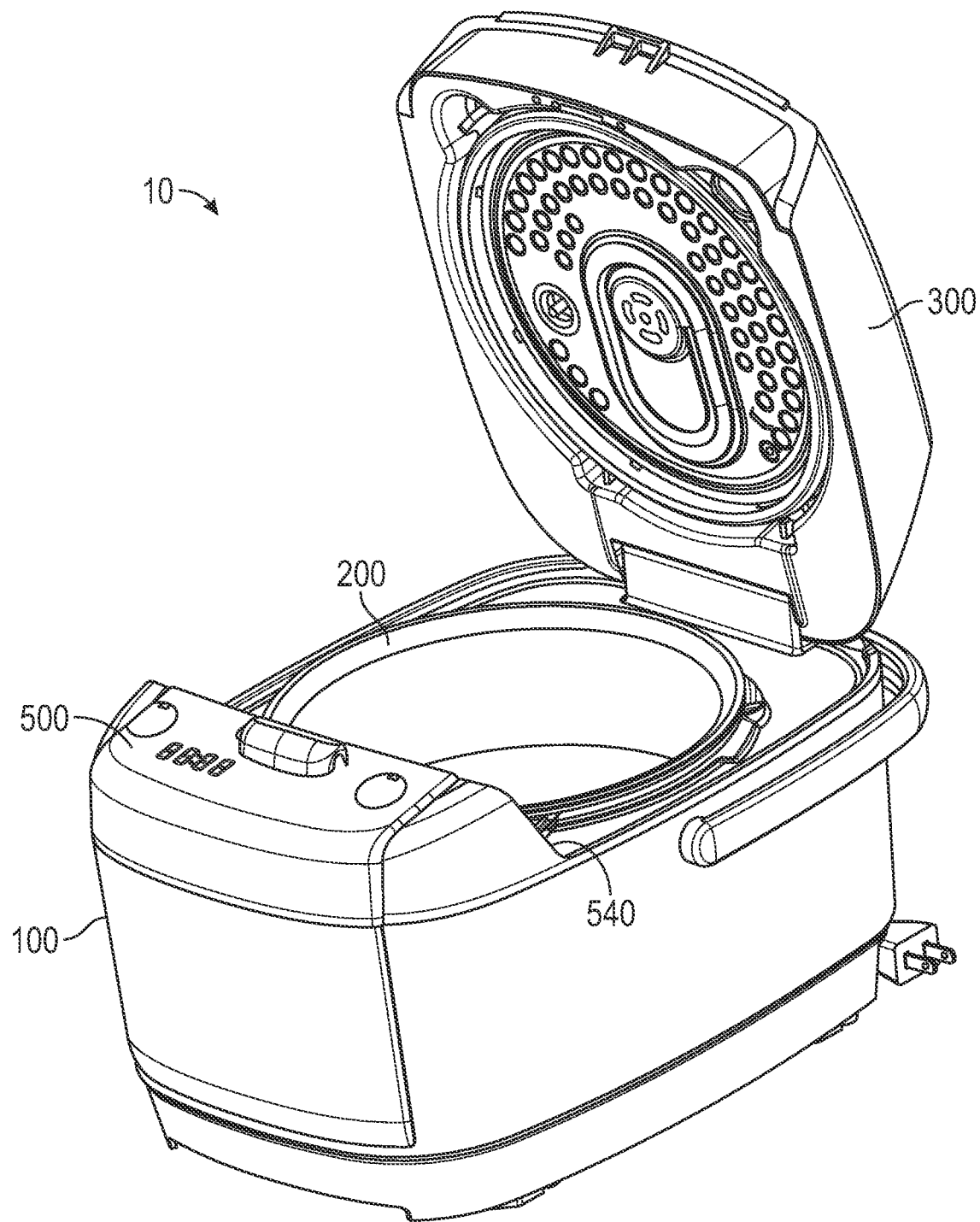
FIG. 3 is a schematic perspective view of the cooking apparatus of FIG. 2.

In an embodiment according to this disclosure, as illustrated in FIG. 2 and FIG. 3, the cooking appliance 10 includes a cooker body assembly, a lid assembly 300, a first control panel 400, a second control panel 500, and a weighing sensor 550 (shown in FIG. 4). The cooker body assembly includes a housing 100 and an inner pot 200 disposed inside the housing 100. The lid assembly 300 can be opened and closed to cover the inner pot 200. The first control panel 400 is disposed on the lid assembly 300. The second control panel 500 is disposed on the housing 100. The weighing sensor 550 is electrically connected to the second control panel 500. The second control panel 500 is configured to control the weighing sensor 550 to measure the weight of a food material in the inner pot 200, and display the weight of the food material.

Specifically, the cooking appliance 10 may include, for example, a rice cooker, an electric pressure cooker, and the like. Taking the rice cooker as an example, since the second control panel 500 is disposed on the housing 100, the second control panel 500 does not flip to the rear side together with the lid assembly 300 when the lid assembly 300 is opened to add food materials or water. As such, when the cooking appliance 10 is in the open-lid state, the second control panel 500 can still be used normally and so can be used to control the weighing sensor 550 to detect the weight information of the food material within the inner pot 200 and further display the weight information of the food material. This makes it easier for users to use the rice cooker's weighing function In addition, the rice cooker proposed in this disclosure is provided with a first control panel 400 on the lid assembly 300 and provided with a second control panel 500 on the housing 100, and the first control panel 400 and the second control panel 500 are further provided with respective control buttons serving different functions. Thus, the rice cooker proposed by this disclosure can make full use of the exterior space of the rice cooker and increase the area of the control interface, making the control interface easy to manipulate and recognize, thereby avoiding the user's misoperation.

Further, in order to prevent the soup of the food material from damaging the second control panel 500, in an embodiment according to this disclosure the top of the housing 100 is provided with a protruding block 540, and the second control panel 500 is fixedly disposed on a top surface of the protruding block 540. Because the second control panel 500 is disposed on the top surface of the protruding block 540 making the second control panel 500 much higher than the inner pot 200, the soup of the food material and the condensed water can be prevented from damaging the second control panel 500. Therefore, the service life of the second control panel 500 can be improved. In addition, disposing the second control panel 500 on the top surface of the protruding block 540 of the housing 100 can also facilitate the user to observe and manipulate the second control panel 500.

However, this disclosure is not limited to such a design; in other embodiments, the second control panel 500 may also be disposed on an outer peripheral wall of the housing 100, such as a front side wall or the like.

Further, in order to make the appearance of the rice cooker more aesthetic, in an embodiment according to this disclosure the first control panel 400 and the second control panel 500 are arranged flush with respect to each other. Specifically, the first control panel 400 is disposed on the top surface of the lid assembly 300, and the second control panel 500 is disposed on the top surface of the protruding block 540. In the closed-lid state, the first control panel 400 and the second control panel 500 are flush with each other. Since the first control panel 400 and the second control panel 500 are arranged flush, the overall appearance of the rice cooker is very aesthetic.

Further, the rice cooker proposed in this disclosure also has the function of indicating the amount of water added. Specifically, the second control panel 500 is provided with a metering button 510 and a display area 520. The metering button 510 is used to trigger the weighing sensor 550, while the display area 520 is used to display the weight of the food material as well as the amount of water added to the food material.

The cooking appliance 10 further includes a first signal processor 560 electrically connected to the second control panel 500. The first signal processor 560 calculates the weight of the food material in the cooking appliance 10 based on the current actual weight of the cooking appliance 10 filled with the food material and the initial weight of the cooking appliance 10. The first signal processor 560 further determines the target amount of water to be added to the food material based on the weight of the food material, the type of the food material, and the cooking function. The first signal processor 560 further displays the target amount of water to be added to the food material through the display area 520. As such, after the user presses the metering button 510, the first signal processor 560 may calculate the target amount of water to be added, and the display area 520 may display the target amount of water.

Specifically, the principle of the first signal processor 560 calculating the target amount of water to be added is illustrated as follows with cooking porridge as an example. First, the weighing sensor 550 measures the initial weight of the cooking appliance 10. Then, an appropriate amount of rice is added to the inner pot 200, the user presses the metering button 510 so that the weighing sensor 550 measures the current actual weight of the cooking appliance 10 which is filled with the food material, and the first signal processor 560 calculates the weight of the food material in the cooking appliance 10 based on the current actual weight and the initial weight. Finally, the first signal processor 560 calculates the target amount of water to be added based on the weight of rice in the cooking appliance 10 and the amount of water corresponding to the unit weight of rice under the porridge function.

Here, it should be noted that the amount of water corresponding to the unit weight of rice under the porridge function is measured through experiments, and the measured data is stored in the first signal processor 560 so that it can be directly called when calculating the amount of water under the porridge function. Similarly, the corresponding amount of water added to the unit weight with the cooking function, the porridge function, and different types of rice are all measured through experiments and can be directly called.

Further, in order to make the amount of water added by the user more accurate, in an embodiment of this disclosure the cooking appliance 10 further includes a first indicator 580 for indicating the amount of water added. The first indicator 580 is electrically connected to the first signal processor 560. When the actual amount of water added is equal to the target amount of water, the first signal processor 560 controls the first indicator 580 to work.

Specifically, when the actual amount of water added is equal to the target amount of water, the first indicator 580 works reminding the user that the target amount of water is appropriate. As an illustrative embodiment, in another embodiment of this disclosure the actual amount of water added and the target amount of water may also have a certain difference, so that when the difference of the actual amount of water added from the target amount of water is less than a preset threshold, the first indicator 580 would be controlled to work thus reminding the user that the amount of water added is appropriate. It can be easily understood that the first signal processor 560 may have a comparison module that can be used to compare the target amount of water to be added and the actual amount of water added, thereby controlling the first indicator 580 to operate according to the comparison result Further, the rice cooker proposed in this disclosure also has the function of indicating the calories of the food material. Specifically, the second control panel 500 is provided with a thermal calculation button 530.

The cooking appliance 10 may further include a second signal processor 565 electrically connected to the second control panel 500 and to the first signal processor 560. The second signal processor 565 calculates the calories of the food material based on the weight of the food material, the type of the food material, and the cooking function. The second signal processor 565 further displays the calories of the food material through the display area 520. As such, after the user presses the thermal calculation button 530, the second signal processor 565 may calculate the calories of the food material, and the display area 520 can display the calories of the food material.

Specifically, the principle of the second signal processor 565 calculating the calories of the food material is illustrated as follows with cooking porridge as an example. First, the second signal processor 565 is connected to the first signal processor 560 to obtain the weight of rice in the cooking appliance 10. Then, the second signal processor 565 can calculate the calories of the porridge after the rice has been cooked to become porridge based on the weight of rice in the cooking appliance 10 and the calories corresponding to the unit weight of rice under the porridge function.

Here, it should be noted that the calories corresponding to the unit weight of rice under the porridge function are measured through experiments, and the measured data is stored in the second signal processor so that it can be directly called when calculating the calories of the porridge under the porridge function. Similarly, the calories corresponding to the unit weight with the cooking function, the porridge function, and different types of rice are all measured through experiments and can be directly called.

Further, in order to allow the user to take in a proper amount of calories to keep the body healthy, the cooking appliance 10 may further include a second indicator 585 for indicating whether the amount of calories of the food material exceeds the standard. The second indicator 585 is electrically connected to the second signal processor 565. When the calories of the food material are greater than the preset threshold calorific value, the second signal processor 565 would activate the second indicator 585.

Specifically, the preset threshold calorific value is set according to the user's own needs. For example, for a user A who wants to lose weight, the preset threshold calorific value may be set to 300 cal. When the user is adding rice, the second signal processor 565 would calculate the actual calorific value according to the weight of the rice. Thus, if the actual calorific value is higher than 300 cal, then the second signal processor 565 will trigger the second indicator 585 to work, reminding the user that the calorific value has exceeded the standard, which allows users to reduce the amount of rice in order to maintain good health It is easy to understand that the second signal processor 565 may have a comparison module that can be used to compare the preset threshold calorific value with the actual calorific value of the food material, so as to control the second indicator 585 to operate according to the comparison result.

Further, as illustrated in FIG. 2, the first control panel 400 is provided with one or more cooking function buttons 410 and a function display area 420. Since the first control panel 400 is used to work in the closed-lid state, the one or more cooking function buttons 410 are used to control the cooking functions of the cooking appliance 10 in the closed-lid state. For example, the one or more cooking function buttons may include a porridge function, a rice cooking function, a steaming function, a timer function, and the like. Accordingly, the function display area 420 on the first control panel 400 can be used to display the cooking times.

The second control panel 500 is used to work in the open-lid state. The second control panel 500 is provided with a metering button 510, a thermal calculation button 530, and a display area 520. In this way, the function of indicating the amount of water added and the function of indicating the calories of the food material can be realized under the open-lid state the rice cooker, thereby improving the convenience of using the rice cooker.

Further, considering that the second control panel 500 is mainly used to work when the cooking appliance 10 is in the open-lid state while the first control panel 400 is mainly used to work when the cooking appliance 10 is in the closed-lid state, in order to save the power consumption of the cooking appliance 10, in an embodiment of this disclosure the first control panel 400 and the second control panel 500 work separately.

Specifically, the cooking appliance 10 further includes a controller, a first control circuit, and a second control circuit. The first control panel 400 is connected to the controller through the first control circuit, and the second control panel 500 is connected to the controller through the second control circuit. When the cooking appliance 10 is in the closed-lid state, the controller turns on the first control circuit and turns off the second control circuit. Otherwise when the cooking appliance 10 is in the open-lid state, the controller turns on the second control circuit and turns off the first control circuit. As such, when the cooking appliance 10 is in the open-lid state, only the second control circuit works; when the cooking appliance 10 is in the closed-lid state, only the first control circuit works. This saves the power consumption of the cooking appliance 10.

However, this disclosure will not be limited to such a design; in other embodiments, the first control panel 400 and the second control panel 500 may also work simultaneously.

The foregoing merely portrays some exemplary embodiments of this disclosure and therefore is not intended to limit the patentable scope of the disclosure. Under the inventive concept of this disclosure, any equivalent structural changes based on the specification and accompanying drawings of the disclosure and any direct/indirect applications of the disclosure on other related technical fields shall all be compassed within the patentable scope of protection of the present disclosure.

What is claimed is:

1. A cooking appliance, comprising:
   a cooker body assembly, further including a housing and an inner pot disposed inside the housing;
   a lid assembly, being openable and closable to cover the inner pot;
   a first control panel, disposed on the lid assembly, wherein the first control panel is provided with one or more cooking functional buttons and a functional display area, the one or more cooking functional buttons being configured to control the cooking appliance under a closed cover condition;
   a second control panel, disposed on the housing, and including a display area; and
   a weighing sensor, electrically connected to the second control panel, the second control panel being configured to control the weighing sensor to measure the weight of rice in the inner pot and further display the weight of the rice at the display area, wherein a top of the housing is provided with a protruding block, and the second control panel is fixedly disposed on a top surface of the protruding block, and wherein the first control panel is disposed on a top surface of the lid assembly, and the first control panel and the second control panel are flush with each other in a closed-lid state;
   wherein the first control panel and the second control panel are configured to work simultaneously.

2. The cooking appliance according to claim 1, wherein the second control panel is provided with a metering button, the cooking appliance further comprising a first signal processor, the first signal processor being electrically connected to the second control panel and configured to:
   calculate the weight of the rice in the cooking appliance based on a current actual weight of the inner pot containing the rice and an initial weight of the inner pot;
   determine a target amount of water to be added to the rice based on the weight of the rice, a type of the rice, and a cooking function; and
   display the target amount of water through the display area.

3. The cooking appliance according to claim 2, further comprising a first indicator, the first indicator being electrically connected to the first signal processor, the first signal processor being configured to activate the first indicator when an actual amount of water added is equal to the target amount of water.

4. The cooking appliance according to claim 2, wherein the second control panel is further provided with a thermal calculation button, the cooking appliance further comprises a second signal processor, the second signal processor being electrically connected to the second control panel and configured to:
   calculate calories of the rice based on the weight of the rice, the type of the rice, and the cooking function; and
   display the calories of the rice through the display area.

5. The cooking appliance according to claim 4, further comprising a second indicator, the second indicator being electrically connected to the second signal processor, the second signal processor being configured to activate the second indicator when the calories of the rice is greater than a preset threshold calorific value.

6. The cooking appliance according to claim 1, wherein the cooking appliance is a rice cooker or an electric pressure cooker.

7. A cooking appliance, comprising:
   a cooker body assembly, further including a housing and an inner pot disposed inside the housing;
   a lid assembly, being openable and closable to cover the inner pot;

a first control panel, disposed on the lid assembly, the first control panel comprising one or more cooking functional buttons and a functional display area, wherein the one or more cooking functional buttons being configured to control cooking functions of the cooking appliance in a closed-lid state;

a second control panel, disposed on the housing and including a display area; and a weighing sensor, electrically connected to the second control panel, the second control panel being configured to control the weighing sensor to measure the weight of rice in the inner pot and further display the weight of the rice at the display area, wherein the second control panel is provided with a metering button and a display area, the cooking appliance further comprising a first signal processor, the first signal processor being electrically connected to the second control panel and configured to:

calculate the weight of the rice in the cooking appliance based on a current actual weight of the inner pot containing the rice and an initial weight of the inner pot;

determine a target amount of water to be added to the rice based on the weight of the rice, a type of the rice, and a cooking function; and display the target amount of water through the display area;

wherein the second control panel is further provided with a thermal calculation button, the cooking appliance further comprises a second signal processor, the second signal processor being electrically connected to the second control panel and configured to:

calculate calories of the rice based on the weight of the rice, the type of the rice, and the cooking function; and display the calories of the rice through the display area; and wherein the first control panel and the second control panel are configured to work simultaneously.

* * * * *